(12) United States Patent
Gibson

(10) Patent No.: US 7,102,983 B2
(45) Date of Patent: Sep. 5, 2006

(54) CURRENT DIVIDER-BASED STORAGE MEDIUM

(75) Inventor: Gary A. Gibson, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 399 days.

(21) Appl. No.: 09/984,419

(22) Filed: Oct. 30, 2001

(65) Prior Publication Data

US 2003/0081533 A1 May 1, 2003

(51) Int. Cl.
*G11B 9/00* (2006.01)

(52) U.S. Cl. ................................. 369/126

(58) Field of Classification Search .............. 369/126, 369/100, 106, 47.4, 47.41; 365/106, 118, 365/119, 151; 257/301.16, 301.17
See application file for complete search history.

(56) References Cited

U.S. PATENT DOCUMENTS

| | | | |
|---|---|---|---|
| 4,090,031 A | 5/1978 | Russell | |
| 4,427,886 A | 1/1984 | Martin et al. | 250/310 |
| 4,534,016 A | 8/1985 | Kirkpatrick et al. | 365/128 |
| 4,600,839 A | 7/1986 | Ichihashi et al. | 250/310 |
| 4,760,567 A | 7/1988 | Crewe | 369/101 |
| 4,817,053 A | 3/1989 | Ikeda et al. | |
| 5,216,631 A | 6/1993 | Sliwa, Jr. | 365/174 |
| 5,307,311 A | 4/1994 | Sliwa, Jr. | 365/174 |
| 5,402,410 A | 3/1995 | Yoshimura et al. | |
| 5,537,372 A | 7/1996 | Albrecht et al. | 369/43 |
| 5,557,596 A * | 9/1996 | Gibson et al. | 369/101 |
| 5,623,295 A | 4/1997 | Kishi et al. | 347/111 |
| 5,724,336 A | 3/1998 | Morton | 369/126 |
| 5,835,477 A | 11/1998 | Binnig et al. | 369/126 |
| 5,923,581 A | 7/1999 | Clerc et al. | |
| 5,936,243 A | 8/1999 | Gibson et al. | 250/306 |
| 6,125,095 A * | 9/2000 | Gemma et al. | 369/126 |
| 6,665,258 B1 * | 12/2003 | Dietzel et al. | 369/126 |

FOREIGN PATENT DOCUMENTS

| | | |
|---|---|---|
| EP | 1091355 | 4/2001 |
| JP | 62246158 | 10/1987 |
| JP | 63316336 | 12/1988 |
| JP | 11120634 | 4/1999 |

OTHER PUBLICATIONS

A. Sato, et al., "Nanometre–scale recording and erasing with the scanning tunnelling microscope" Nature vol. 363 Jun. 3, 1993 P.P. 431–432.

V.P. Jaecklin, et al. "Novel polysilicon comb actuators for xy–stages" Micro Electro Mechanical Systems '92, Feb. 4–7, 1992, P.P. 147–149.

E. Betzig, etal., "Fiber laser probe for near–field scanning optical microscopy" Appl. Phys. Lett. 63 (26), Dec. 27, 1993, P.P. 3550–3552.

Sumio Hosaka, et al., "Nanometer–sized phase–change recording using a scanning near–field optical microscope with a laser diode" Jpn. J. Appl. Phys. vol. 35, Part 1, No. 1B, 1995, P.P. 443–447.

(Continued)

*Primary Examiner*—Muhammad Edun (57) ABSTRACT

A data storage medium that includes several stacked layers. The stacked layers can be conducting, insulating, resistive, or capable of changing between two or more states or phases. Also, a data storage device that includes the data storage medium and an energy source that can form nanometer-scaled data bits in regions of the data storage medium. The data bits can include holes through some of the stacked layers or phase-changes in portions of the layers capable of changing between two or more states. Further, a method of using such a storage medium to store nanometer-scaled data bits.

32 Claims, 5 Drawing Sheets

OTHER PUBLICATIONS

C. Liu, etal., "High–density nanosecond charge trapping in thin films of the photoconductor ZnODEP" Science, vol. 261, Aug. 13, 1993, P.P. 897–899.

E. Huber, et al., "Laser–induced crystallization of amorphous GeTe: A time–resolved study" Physical Review B, vol. 36, No. 3, Jul. 15, 1987, P.P. 1595–1604.

B.G. Yacobi, et al., "Electron–beam–induced information storage in hydrogenated amorphous silicon devices" Appl. Phys. Lett. 44(7), Apr, 1, 1984, P.P. 695–697.

Roger T. Howe, et al., "Silicon micromechanics: sensors and actuators on a chip" IEEE Spectrum, Jul. 1990, P.P. 29–35.

Gary W. Jones et al., "Silicon field emission transistors and diodes" IEEE Transactions on Components, Hybrids, and Manufacturing Technology, vol. 15, No. 6, Dec., 1992, P.P. 1051–1055.

C.A. Spindt, et al., "Physical properties of thin–film emission cathodes with molybdenum cones" Journal of Applied Physics, vol. 47, No. 12, Dec., 1976, P.P. 5248–5263.

R. C. Barrett, et al., "Charge storage in a nitride–oxide–silicon medium by scanning capacitance microscopy" J. Appl. Phys. vol. 70 (5), Sep. 1, 1991 P.P. 2725–2733.

T.R. Albrecht, et al. "Nanometer–scale hole formation on graphite using a scanning tunneling microscope" Appl. Phys. Lett. 55 (17), Oct. 23, 1989, P.P. 1727–1729.

S. Hoen, et al., "Thermomechanical data storage using a fiber optic stylus" Appl. Phys. Lett, vol. 64, No. 3, Jan. 17, 1994 P.P. 267–269.

U. Staufer, et al., "Direct writing of nanometer scale structures on glassy metals by the scanning tunneling microscope" Z. Phys. B—Condensed Matter 77, 1989, P.P. 281–286.

H.J. Mamin, et al., "Atomic emission from a gold scanning–tunneling–microscope tip" Physical Review Letters, vol. 65, No. 19, Nov. 5, 1990, P.P. 2418–2421.

J. A. Miller, et al., "Scanning tunneling microscopy bit making on highly oriented pyrolytic graphite: Initial results" J. Appl. Phys. vol. 68 (2), Jul. 15, 1990 P.P. 905–907.

S. E. McBride, et al. "Nanometer–scale features produced by electric–field emission" Appl. Phys. Lett., 59 (23), Dec. 2, 1991 P.P. 3056–3058.

S. Hosaka, etal., "SPM–based data storage for ultrahigh density recording" Nanotechnology 8, 1997 P.P. A58–A62.

* cited by examiner

CURRENT DIVIDER-BASED STORAGE MEDIUM

CROSS-REFERENCES TO RELATED APPLICATIONS

This application is related to U.S. Patent Application to Gary Gibson entitled AFM VERSION OF DIODE- AND "CATHODOCONDUCTIVITY- AND CATHODOLUMINESCENCE-BASED DATA STORAGE MEDIA", application Ser. No. 09/726,621 filed Dec. 1, 2000, to U.S. Patent Application to Gary Gibson entitled "METHODS FOR CONDUCTING CURRENT BETWEEN A SCANNED-PROBE AND STORAGE MEDIUM", application Ser. No. 09/783,008 filed Feb. 15, 2001 and to U.S. Patent Application to Gary Gibson entitled "SUPPLEMENTARY ENERGY SOURCES FOR ATOMIC RESOLUTION STORAGE MEMORY DEVICES", filed concurrently herewith. These applications are incorporated herein in their entirety by reference.

BACKGROUND OF THE INVENTION

1. Field of the Invention

The present invention relates generally to a storage medium for an ultra-high density data storage device.

2. Description of the Related Art

Recently, scientists have been developing alternative ultra-high-density data storage devices and techniques useful for operating ultra-high-density data storage devices. These devices and techniques store data bits within storage regions sized on the nanometer scale and possess advantages over conventional data storage devices. Among these advantages are quicker access to the data bits, a lower cost per bit and enablement of the manufacturing of smaller electronic devices.

Figure 1:
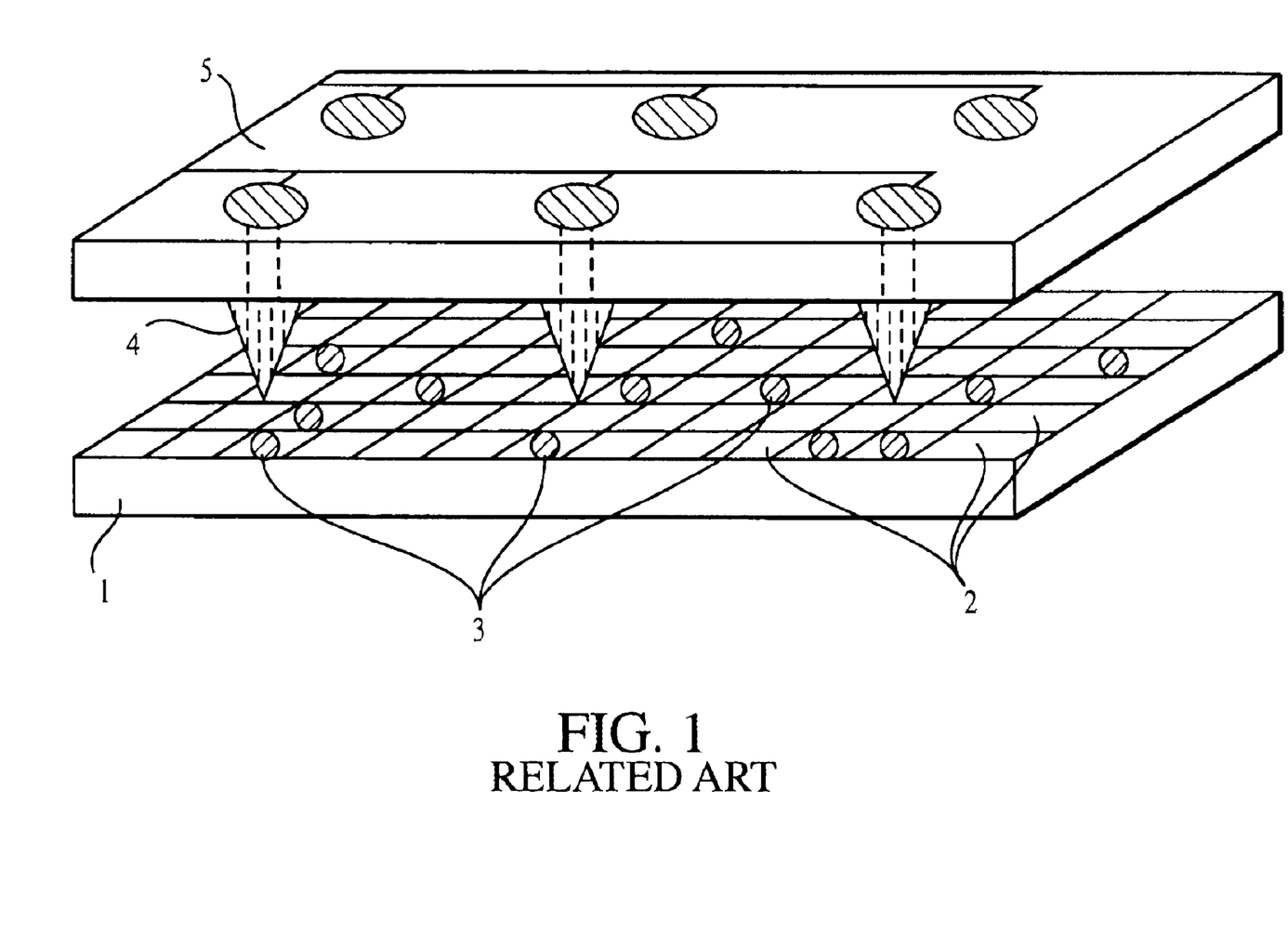
FIG. 1 illustrates a top perspective view of an ultra-high-density data storage device configuration according to the related art

FIG. 1 illustrates an ultra-high-density data storage device configuration according to the related art. This configuration includes a storage medium 1 that is separated into many storage regions. These storage regions are illustrated as squares on the storage medium 1 and are each capable of storing one data bit.

Two types of storage regions are illustrated in FIG. 1. One type includes unmodified regions 2 that typically store data bits representing the value "0". The other type includes modified regions 3 that typically store data bits representing the value "1". Typical periodicities between any two storage regions range between 1 and 100 nanometers FIG. 1 also illustrates, conceptually, emitters 4, positioned above the storage medium 1, and a gap between the emitters 4 and the storage medium 1. The emitters 4 are capable of emitting electron beams and are arranged on a movable emitter array support 5 (also known as a "micromover") that can hold hundreds or even thousands of emitters 4 in a parallel configuration. The emitter array support 5 provides electrical connections to each emitter 4, as illustrated conceptually by the wires on the top surface of emitter array support 5.

The emitter array support 5 can move the emitters 4 with respect to the storage medium 1, thereby allowing each emitter 4 to scan across many storage regions on the storage medium 1. Alternatively, the storage medium 1 can be placed on a platform that moves the storage medium 1 relative to the emitter array support 5. Movement of the platform can be actuated electrostatically, magnetically or by the use of piezoelectrics. However, regardless of whether the support 5 or the storage medium 1 moves, the range of motion of the emitter array support 5 relative to the storage medium 1 can be large enough to allow each emitter 4 to travel across and to have access to data bits in tens of thousands or even millions of data storage regions.

As an emitter 4 moves relative to the storage medium 1, the emitter 4 can bombard a nanometer-scaled storage region on the surface of the storage medium 1 with either a high-power-density or a low-power-density electron beam. When a high-power-density beam is emitted, the beam can locally alter the material characteristics of the bombarded region. For example, the high-power-density beam can create defects in the bombarded region or can locally heat up a crystalline region such that the region later cools into an amorphous state of the same material. By these and other processes, the phase of the bombarded region can be changed and the emitter 4 can write "1" data bits to the storage medium 1.

When a low-power-density electron beam is emitted, the beam no longer has enough power to alter the material characteristics or state of the bombarded region. Hence, a writing operation does not take place. Instead, a reading operation can take place by monitoring the path of the electrons in the beam or the effect of the electrons in the beam on the bombarded region. As will be discussed below, monitoring the path of the electrons and/or the interactions of the electrons with the bombarded region allows for a determination to be made as to whether or not the low-power-density beam is bombarding a region of the storage medium 1 that has previously been "written to" and now contains a "1" data bit.

Specifically, in order to determine whether a "1" data bit or a "0" data bit is being bombarded, several options exist. One of these options, which proves useful when "1" data bits include an amorphous material and "0" data bits include the same material in a crystalline phase, involves monitoring the number of beam electrons that are backscattered from the bombarded region over time.

Since amorphous and crystalline phases of the same materials have different backscattered electron coefficients (BECs), different numbers of electrons are backscattered by "1" and "0" data bits in the storage medium 1 when the same low-power-density beam bombards each data bit. Hence, by monitoring the number of electrons backscattered from a given region as it is being bombarded by a low-power-density electron beam, it is possible to determine whether the region contains a "0" data bit or a "1" data bit.

Some specific embodiments of the ultra-high-density data storage device discussed above are disclosed in U.S. Pat. No. 5,557,596 to Gibson et al. (Gibson '596), the contents of which are incorporated herein in their entirety by reference. In addition to discussing the backscattered electron reading technique and the technique that involves writing amorphous data bits in a crystalline storage medium 1, the Gibson '596 patent also discusses a variety of other writing and reading methods.

BRIEF SUMMARY OF THE INVENTION

A data storage device including a data storage medium that includes a first layer at a surface of the storage medium and a second layer between the first layer and a third layer, an energy source positioned proximate to the data storage medium, and a nanometer-scaled data bit extending through a portion of the second layer.

A method of storing data including providing a data storage medium that includes a first layer at a surface of the storage medium and a second layer between the first layer and a third layer, writing a nanometer-scaled data bit in the second layer by bombarding the storage medium with a high-power-density beam, and reading the data bit by bombarding the data storage medium with a low-power-density beam.

BRIEF DESCRIPTION OF THE DRAWINGS

The invention will be described by way of example, in the description of exemplary embodiments, with particular reference to the accompanying drawings in which.

DETAILED DESCRIPTION OF THE INVENTION

Figure 2:
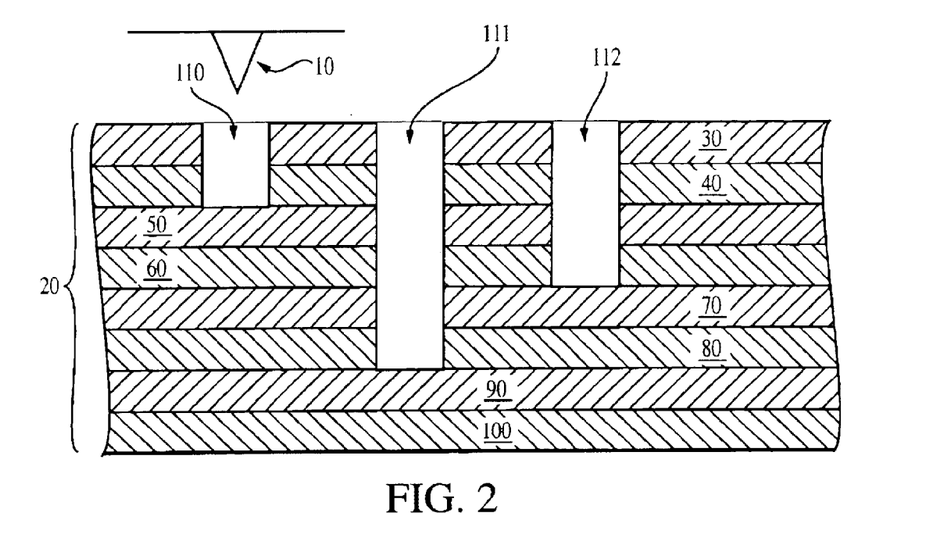
FIG. 2 illustrates a cross-sectional view of a data storage device according to a first embodiment of the present invention.

FIG. 2 illustrates a cross-sectional view of a data storage device according to certain embodiments of the present invention. The device includes an energy source 10 positioned above a data storage medium 20. The data storage medium 20 includes a sequential stacking of conductor layers 30, 50, 70, 90 and insulator layers 40, 60, 80, 100. The data storage medium 20 includes, but is not limited to, a first conductor layer 30, a first insulator layer 40, a second conductor layer 50, a second insulator layer 60, a third conductor layer 70, a third insulator layer 80, a fourth conductor layer 90, and a fourth insulator layer 100.

Also illustrated in FIG. 2 are three data bits 110, 111, 112. The first data bit 110 includes an opening or hole that extends through the first conductor layer 30 and first insulator layer 40. The second data bit 111 includes a hole that extends not only through the first conductor layer 30 and first insulator layer 40, but also through the second conductor layer 50, the second insulator layer 60, the third conductor layer 70, and the third insulator layer 80. The hole of the third data bit 112 extends through the first conductor layer 30, the first insulator layer 40, the second conductor layer 50, and the second insulator layer 60.

Figure 3:
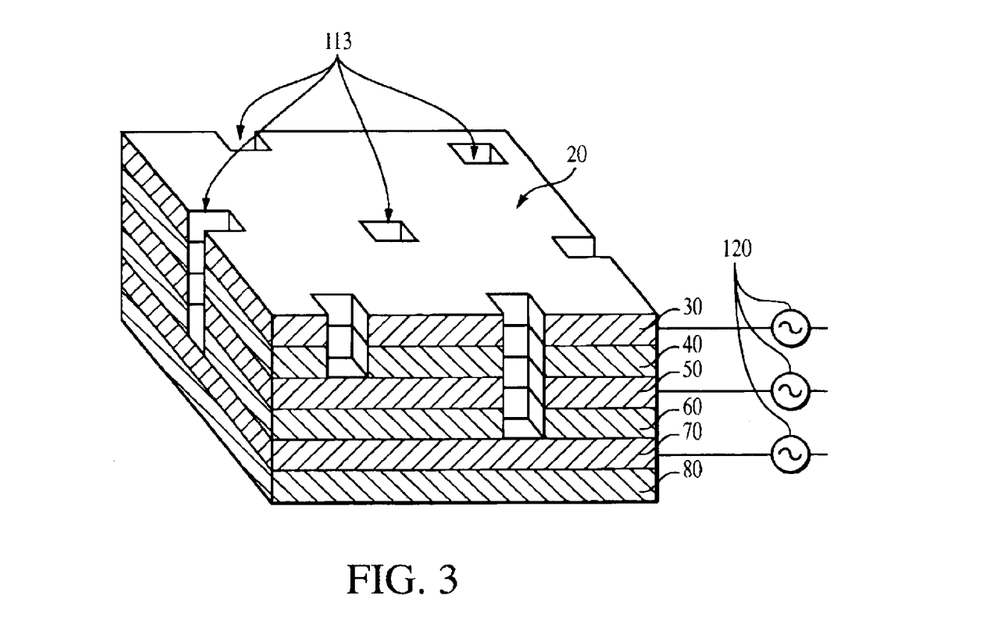
FIG. 3 illustrates a top perspective view of a cut-away of a data storage medium according to a first embodiment of the present invention.

FIG. 3 illustrates a top perspective view of a cut-away portion of a data storage medium 20 according to certain embodiments of the present invention. Representative data bits 113 are shown with holes extending through several of the conductor layers 30, 50, 70 and insulator layers 40, 60, 80. The cross-sectional diameter of the holes, and therefore the size of the data bits, can be on the order of nanometers or of micrometers, although larger holes are also within the scope of the present invention.

FIG. 3 also illustrates a set of current meters 120, each electrically connected to a conductor layer 30, 50, 70. Each meter 120 can be electrically floated to apply a bias to the conductor layer 30, 50, 70 to which it is connected and allows for monitoring of the amount of current flowing from the conductor layer 30, 50, 70 to which it is attached. The meters 120 can be used in conjunction with many of the embodiments of the present invention.

There is no upper limit to the number of conductor layers 30, 50, 70 and insulator layers 40, 60, 80, 100 that can be used as part of the data storage media 20 shown in FIGS. 2 and 3. However, certain embodiments of the present invention require that at least the first conductor layer 30, the first insulator layer 40, and the second conductor layer 50 be present.

The energy source 10 can include a source of light energy, thermal energy, and/or energy in the form of an electron beam. An energy source 10 that provides an electron beam can come in the form of a device such as, but not limited to, a field emitter such as a Spindt emitter or a thermally assisted field emitter such as a Schottky emitter. The energy source 10 is typically positioned proximate to the data storage medium 20 (e.g., within 0 to 10,000 nanometers). However, the energy source 10 and the data storage medium 20 may be separated by a larger or smaller distance.

Although only one energy source 10 is illustrated in FIG. 2, many energy sources 10 can be positioned proximate to the surface of the data storage medium 20 on components such as, but not limited to, the emitter array support 5 discussed above. Also, one or more secondary energy emitters, not illustrated in FIG. 2 but that typically emit energy other than electron beam energy, can be positioned adjacent or proximate to the energy sources 10. The energy sources 10 and the secondary energy emitters can move relative to the storage medium 20. However, they are not limited to the travel distance restrictions of the emitter array support 5 disclosed in the Gibson '596 patent.

A secondary energy source could also be positioned adjacent (e.g. under) the storage medium 20. Such a secondary energy source could be used to bias the temperature of some region of the storage medium 20, thereby making it easier for the primary energy source to write a bit, while still maintaining high resolution.

The conductor layers 30, 50, 70, 90 can include conductive materials such as, but not limited to, metals, and can be as thin as desired (e.g., two to three nanometers or less), so long as continuous layers are formed. The conductor layers 30, 50, 70, 90 can also be as thick as desired (e.g., 100 nanometers or more), so long as an energy source 10 or a secondary energy emitter is capable of forming holes through the layers by bombarding the layers with a high-power-density energy beam, as will be discussed below.

The insulator layers 40, 60, 80, 100 can include insulating materials such as, but not limited to, semiconductors and ceramics and are typically at least of sufficient thickness to ensure that a continuous layer is formed. Further, the thickness can be chosen to ensure that electrical isolation is provided between adjacent conductor layers 30, 50, 70, 90. Hence, insulator layers 40, 60, 80, 100 of at least two nanometers of thickness can be used, though thicker layers, such as those of 100 nanometers or more, are typically used to ensure electrical isolation. Further, the insulator layers 40, 60, 80, 100 are also typically chosen to be thin enough to ensure that an energy source 10 or a secondary energy emitter is capable of forming holes through the layers by bombarding them with high-power-density energy beams.

The insulator layers 40, 60, 80, 100 can include a material that recedes once a hole has been formed. For example, when an energy source 10 bombards the data storage medium 20 with a high-power-density energy beam and forms a hole through the first conductor layer 30 and the first insulator layer 40, the material in the first insulator layer 40 may be chosen to shrink, thereby effectively expanding the hole. The shrinking behavior can, for example, be promoted by choosing appropriate materials or by placing the first insulator layer 40 in tension and allowing the internal stresses to be relieved as the hole expands.

Alternatively, the material can be evaporated or sublimated away by the writing energy source 10 or secondary energy emitter, as long as the material is not re-deposited in a location that interferes with the operation of the device (e.g. on the energy source 10). Another alternative is to use an insulating material that is melted by the energy source 10 and that then flows laterally, due to surface tension or capillary action, to form a hole. Yet another alternative is for the writing energy source 10 to create cracks in the material or to make the material porous in a way that allows more electrons through to a deeper electrode during the read operation. Cracking can be caused, for example, by differential contraction due to heating by the energy source, or by evaporation or sublimation.

The insulator layers 40, 60, 80, 100 can be chosen to be electrically and/or thermally insulating. The proper choice of thermal properties for both the insulating and conductive layers can be used to minimize the size of the holes that are created while also minimizing the power required to write a hole.

The data bits 110, 111, 112, 113 can be formed through two, four, six, or more layers of the data storage medium 20. The data bits 110, 111, 112, 113 can be formed by sufficiently heating the layers of the storage medium 20 with a high-power-density energy beam to cause local evaporation or sublimation of some of the material in the layers. The data bits 110, 111, 112, 113 can also be formed by direct ablation of material due to bombardment by a high-power-density energy beam consisting of massive particles (e.g., electrons via electron-stimulated desorption). The holes can further be formed via melting and flow of material.

Choosing an insulator layer material and/or a conductor layer material with a low melting point, a low vaporization temperature, and/or a high vapor pressure at low temperatures can aid in the formation of holes and can therefore reduce the power density needed to form data bits 110, 111, 112, 113. Choosing a combination of insulator and conductor layer materials with appropriate wetting properties can also promote the formation of data bits 110, 111, 112, 113.

The energy source 10 and secondary energy emitters can be selected to be capable of bombarding the storage medium 20 with energy beams that produce micron-sized spots on the surface of the data storage medium 20. However, the spot size of the beam can also be chosen to be larger or to be nanometer-scaled.

An energy source 10 and a secondary energy emitter can be operated to produce either a high-power-density beam or a low-power-density beam. The level of beam power density selected determines whether the energy source 10 or secondary energy emitter is being used to read or write data bits 110, 111, 112, 113.

According to certain embodiments, a secondary energy emitter emits a high power density of a type of energy such as light or thermal energy to form holes in the storage medium 20, then the energy source 10 emits a low-power-density electron beam during the reading operation. According to such embodiments, the writing can be done, for example, by a near-field optical beam.

When an energy source 10 bombards a data bit 110, 111, 112, 113 with a low-power-density electron beam, holes are not formed. Instead, a reading operation can take place. More specifically, if the electrons in a low-power-density electron beam are able to travel to a particular conductor layer 30, 50, 70, a signal current will develop in the layer.

However, if the electrons in the low-power-density electron beam are blocked by an insulator layer 40, 60, 80, very little or substantially no signal current will be detected in the conductor layers 50, 70, 90 under the blocking insulator layer 40, 60, 80. Though a small fraction of the beam current may penetrate through the topmost layer or layers that are not removed, how far the electron beam penetrates is a function of the beam energy. If a low beam energy is used, then the current that penetrates to the next conducting layer will be negligible.

Hence, by monitoring the amount of signal current in each conductor layer 30, 50, 70, it is possible to determine which of the conductor layers 30, 50, 70 is the one furthest from the energy source 10 that is still being bombarded with electrons. It should be noted that judicious application of bias voltages to the various conductor layers 30, 50, 70 can optimize the signal current collected at the lowest exposed layer without causing too large of a leakage current between the layers in the absence of the read electron beam.

When performing a reading operation on the data storage medium 20 in FIG. 3, if only the first conductor layer 30 has a signal current monitored in it, no hole has been formed in any of the layers of the data storage medium 20 beneath where the low-power-density beam is bombarding. Hence, the data bit being read can be assigned a value such as "0". If the first conductor layer 30 and the second conductor layer 50 each have signal currents monitored in them, then a hole has been formed locally through the first conductor layer 30 and the first insulator layer 40, and the data bit can be assigned a value such as "1". When additional layers have been locally removed during the writing process, higher-order data bits are present and can be assigned values such as "2", "3", and so on. Hence, the data storage media 20 of the present invention are not limited to storing binary data.

In embodiments where both an energy source 10 and a secondary energy emitter are used, the secondary energy source is generally not used in a low-power-density mode.

However, certain embodiments of the present invention do make use of a low-power-density secondary energy source to read data bits from the storage medium 20. According to certain of these embodiments, each conductor layer 30, 50, 70, 90 can be replaced with a photoconductive material. Then, a bias can be applied along the length of each photoconductor layer and the photoconductivity of the layer can be monitored (e.g., a bias can be applied at one end and the signal current can be measured at the other, grounded end). Then, if a low-power-density optical beam reaches a particular photoconductive layer, the beam increases the current flow along the layer, providing a signal.

Alternately, the conducting layers can be replaced with photoluminescent layers that luminesce at different wavelengths. Then, an optical beam or beams can be used to stimulate the photoluminescence and, from the spectrum that is emitted, the depth of the written bit can be determined. Further, the detection schemes discussed above may also be used with electron beams utilizing, for example, cathodoconductivity and cathodoluminescence rather than photoconductivity and photoluminescence.

Figure 4:
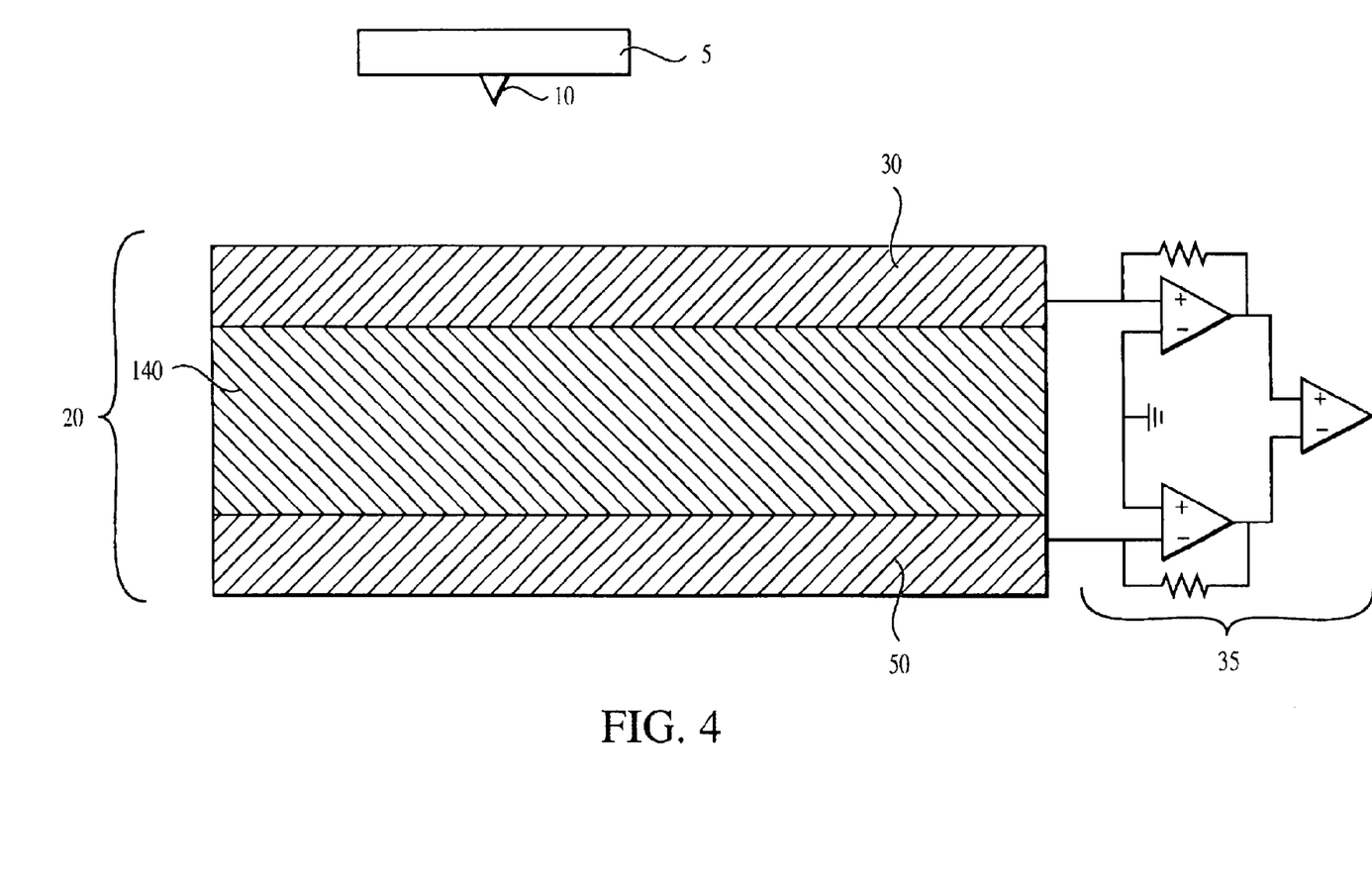
FIG. 4 illustrates a cross-sectional view of a data storage device with a storage medium that includes two conductor layers and a phase-change layer between the conductor layers.

FIG. 4 illustrates a data storage device according to other embodiments of the present invention wherein holes are not formed through any of the layers. The device illustrated in FIG. 4 includes a micromover 5, an energy source 10, a storage medium 20, and electronics 35 connected to the storage medium 20. The storage medium 20 includes a first conductor layer 30, a second conductor layer 50, and a phase-change layer 140 between the first conductor layer 30 and the second conductor layer 50. The device can also include more than one energy source 10 and one or more secondary energy emitters (not shown) proximate to the energy sources 10.

Figure 5:
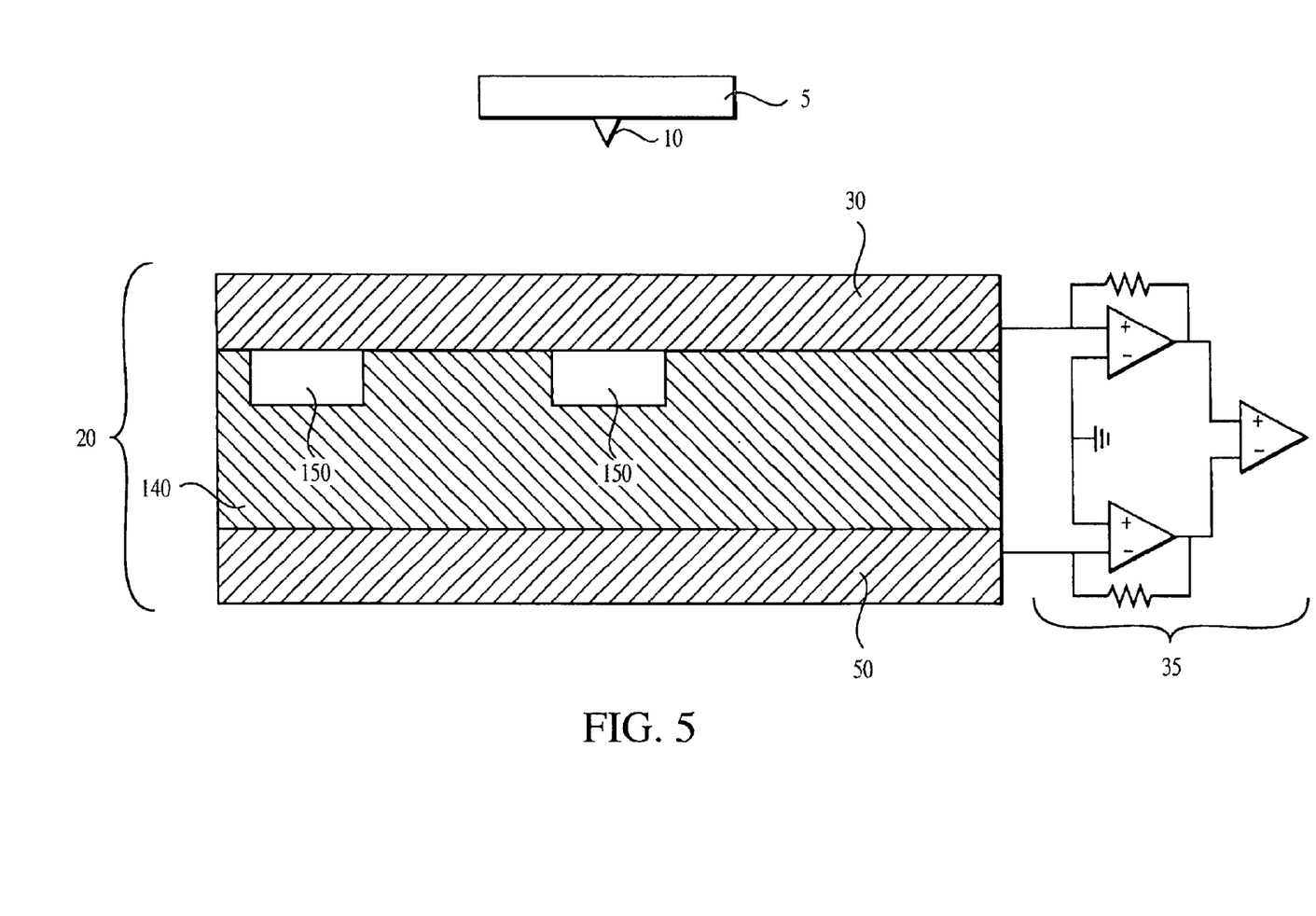
FIG. 5 illustrates a cross-sectional view of the data storage device of FIG. 4 wherein a data bit of a phase other than the phase of the remainder of the phase-change layer has been formed in the phase-change layer.

FIG. 5 illustrates the device of FIG. 4 after the phase-change layer 140 has experienced localized phase changes in portions of the material thereof. These phase-changed portions are represented as the data bits 150 that are adjacent to the first conductor layer 30. The data bits 150 may have nanometer-scale dimensions, micrometer-scale dimensions, or may be larger and can be formed as a high-power-density energy beam from the energy source 10 and/or from a secondary energy emitter bombards localized regions of the storage medium 20. Also, instead of having a second emitter, one or more resistive heating elements could be used to heat regions of the sample. These heating elements would provide enough localized heat to aid the primary, localized heat source but would not provide enough heat to write by themselves.

The phase-change layer 140 can include a phase-change material that is capable of being altered from a first phase (e.g., a crystalline phase or a phase with few structural defects) to a second phase (e.g., an amorphous phase or a phase with many structural defects) as it is bombarded by a high-power-density beam. According to certain embodiments, the resistivity of the data bits 150 in the phase-change layer 140 changes along with the phase of the material.

The phase-change layer 140 can include chalcogenide alloys such as, but not limited to, GeTeSb alloys. Materials that have a low transition temperature between their first phase and their second phase can be used as part of the phase-change layer 140, thereby lessening the power required from a bombarding high-power-density energy beam to transform the material from the first phase to the second phase.

Although only materials with two phases are discussed above, materials with more than two phases are also within the scope of the present invention. Such materials, if used as part of the phase-change layer 140, allow for higher-order data bits 150 to be written to the storage medium 20.

One or more material included in the phase-change layer 140 may be chosen to be anisotropically conductive in at least one phase. One advantage of using a material that is anisotropically conductive in one phase is to prevent cross-talk between the data bits 150 when a reading operation is performed. According to certain embodiments, the phase change layer 140 is chosen to be anisotropic in its more resistive state, with a lower in-plane conductivity. Also, to minimize cross-talk between bits, some embodiments of the present invention also minimize the thickness of the phase-change layer and/or depth of the bit relative to the diameter of the bits and/or the spacing between them.

The first conductor layer 30 and the second conductor layer 50 can include any conductive materials such as, but not limited to, refractory metals that will not be easily damaged during the write process. The first conductor layer 30 and the second conductor layer 50 can also include elements of low atomic number and/or of low mass density that are more easily penetrated by the incident electrons during the read process. Such elements can be deposited as very thin layers (e.g., as films with thicknesses on the order of 100 nanometers, 10 nanometers, or less) to allow for an energy beam, such as an electron beam, bombarding the storage medium 20 to traverse the layers 30, 50 relatively easy. However, thicker layers 30, 50 are also within the scope of the present invention.

The first conductor layer 30 and the second conductor layer 50 can be connected to the electronics 35 as illustrated in FIG. 4. The electronics 35 may be of any configuration that provides the ability to monitor the currents flowing through the first conductor layer 30 and the second conductor layer 50. Although differential amplifiers that measure relative currents are illustrated in FIGS. 4 and 5, it is not always desirable to measure the difference in currents collected by the first conductor layer 30 and the second conductor layer 50. In some cases, it may be better, for example, to simply measure the current collected by the conductor layer furthest from the surface, especially if this current is small compared to the current collected by the top conductor. Otherwise, the noise in the top conductor current might overwhelm the signal. In such cases, other types of electronics 35 are used.

Beam optics can be used to focus the energy beam from the energy source 10 and/or the secondary energy emitter onto nanometer- or micrometer-scaled regions of the storage medium 20. Optics can also be used to focus the beams of devices such as those illustrated in FIGS. 2 and 3. However, they are often not necessary since the energy beams themselves can be of very small dimensions and in close proximity to the storage medium, thereby benefiting from proximity focusing.

As discussed above, the writing operation for the data storage device illustrated in FIGS. 4 and 5 involves bombarding the data storage medium 20 with high-power-density energy beams. Because the first conductor layer 30 can be manufactured to be penetrable by the energy beam, the beam alters the phase of a localized portion of the phase-change layer 140 and forms a data bit 150. The presence or absence of a data bit 150 in the bombarded region is then determined during a reading operation.

Alternatively, the write beam can heat the top conductor layer 30 without penetrating to the phase-change layer 140. The hot conductor layer 30 would then cause the phase-change layer 140 to be heated and modified as heat would flow from the conductor layer 30 to the phase-change layer 140. In such embodiments, the conductor layer 30 should be able to withstand temperatures significantly higher than the temperature required to change the phase of the phase-change layer 140. Also, the thermal sheet resistance of the conductor layer 30 should be sufficiently high so that the conductor layer 30 does not cause lateral spreading of the size of the heated region of the phase-change layer 140.

During the reading operation, the energy source 10 can bombard the storage medium 20 with a low-power-density electron beam that traverses the first conductor layer 30 but that does not alter the local structure of the bombarded region. Instead, a large fraction of the electrons of the low-power-density electron beam can be injected between the conductor layers 30, 50.

When a high enough beam energy is used, then the currents flowing into conductors layers 30, 50 due to the injected electrons from the read beam can be made equal. However, when a lower energy is used, the current reaching the bottom conductor layer 50 will be lower than the current reaching the top conductor layer 30. Hence, monitoring the current reaching the bottom conductor layer 50 may be desirable in some embodiments of the present invention. This current could be very small underneath a conductive data bit 150 and larger where there was no data bit 150. However, the current in the bottom conductor layer 50 will generally be smaller than the current on the top conductor layer 30 since the top conductor layer 30 generally will absorb a lot of the incident beam.

In other words, the number of electrons that are injected at a given depth between the conductor layers 30, 50 will depend on, among other factors, the thickness and mass density of each conductor layer 30, 50, the thickness and mass density of the phase-change layer 140, and on the beam energy and intensity. For example, when the conductor layers 30, 50 are held at the same potential and are placed on either side of a phase-change layer 140 that is of uniform phase and that does not contain any data bits 150, the electrons that are injected at a depth z will travel to the conductor layers 30, 50 in a ratio that is the inverse of the ratio of the resistance from depth z to each of the conductor layers 30, 50. Thus, half of the electrons injected midway between the conductors 30 and 50 will travel to each of these conductor layers 30, 50. On the other hand, electrons injected at a depth that is ¼ of the way between the conductor layers 30, 50 will be divided such that ¾ of the electrons travel to conductor layer 30 and the other ¼ travels to the other conductor layer 50.

In the phase-change layer 140 of FIG. 5, the electrons injected into the middle portion of the phase-change layer 140 no longer face a constant resistivity throughout the phase-change layer 140. Instead, the data bits 150, that include localized regions of second-phase material, can have either higher or lower localized resistivity. This changes the total resistance from any given point in the phase-change layer 140, near the data bit 150, to each of the conductor layer 30, 50. Again, electrons injected at a given point in the phase-change layer 140 will travel to the conductor layers 30, 50 in a ratio that is the inverse of the total resistance between that point and each of the conductor layers 30, 50.

If the data bits 150 illustrated in FIG. 5 are less resistive than the remainder of the phase-change layer 140, fewer injected electrons will travel to the second conductor layer 50 and less current will be detected by the electronics 35 in the second conductor layer 50. The reverse would be true if the data bits 150 near the second electrodes 60 were more resistive than the material in the remainder of phase-change layer 140. Hence, by locally bombarding nanometer- or micrometer-dimensioned cross-sectional areas on the surface of the phase-change layer 140, it is possible to determine whether the bombarding electrons are incident on data bits 150 or not. Hence, data bits 150 can be detected and data can be read from the storage medium 20 via the electronics 35.

It should be noted that the concept of resistance is used here in its broadest sense to refer to the set of all physical phenomena that influence how electrons flow in the storage medium 20 and that determine to which conductor layer 30, 50 or electrode they travel. At very short length scales, for example, on the order of the mean-free path of the electrons, this set of physical phenomena is somewhat different than at longer length scales. Thus, the physics of the read process can be somewhat different for very small data bits 150 than for larger bits 150. It should also be noted that contrast in the fraction of the incident current that travels to each conductor layer 30, 50 can be obtained if the presence of a data bit 150 creates a more or less resistive interface to the conductor layer 30, 50. For example, in one state (written or unwritten) the phase-change layer 140 material might form a Schottky barrier, charged interface, or some other sort of energy barrier at the interface with a conductor layer 30, 50. This formation may affect the probability of electrons traveling to that conductor layer 30, 50.

According to other embodiments of the present invention (not illustrated), a phase-change layer and a resistive layer can be positioned between a top conductor layer and a bottom conductor layer. The resistivity of the resistive layer can be fixed to be midway between the resistivities of the amorphous and crystalline states of the phase-change layer. Use of such a configuration can increase the signal contrast between written and unwritten regions of the phase change layer.

Figure 6:
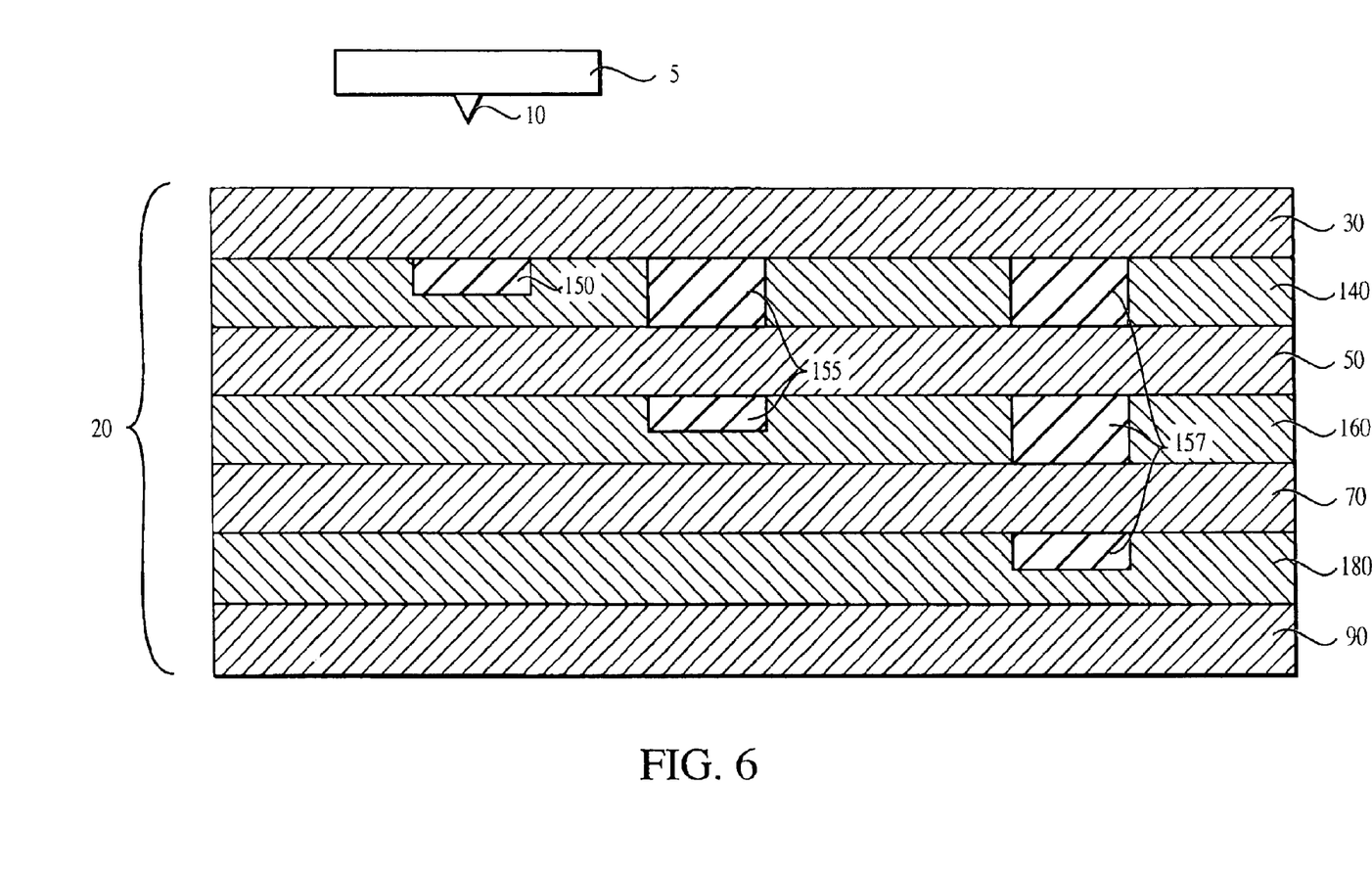
FIG. 6 illustrates a cross-sectional view of a data storage device that includes several conductor layers and several phase-change layers.

FIG. 6 illustrates yet another embodiment of a data storage device according to the present invention. The device illustrated in FIG. 6 includes an energy source 10 that can be placed on a micromover 5 and also includes a data storage layer 20 that itself includes several phase-change layers 140, 160, 180 between several conductor layers 30, 50, 70, 90.

The three layers 30, 140, 50 closest to the energy emitter 10 in the device illustrated in FIG. 6 can operate in a manner similar to the device illustrated in FIGS. 4 and 5. For example, the data bit 150 on the left side of FIG. 6 comprises a localized area of material in a second phase partially extending through a phase-change layer 140 in a first phase. When bombarded with a low-power-density electron beam, the data bit 150 can again be detected by monitoring the relative strengths of the signal currents in the first conductor layer 30 and the second conductor layer 50.

The device in FIG. 6, however, includes additional phase-change layers 160, 180, additional conductor layers 70, 90, and data bits 155, 157 that extend completely through the first phase-change layer 140 and partially through at least one other phase-change layer 160, 180. In alternate embodiments, the data bits 155, 157 do not change the phase of the upper storage layers. The device in FIG. 6 can alter the contrast in the ratio of signal currents going to the two conductor layers adjacent to the phase-change layer that includes the portion of a data bit 150, 155, 157 furthest from the first phase-change layer 140.

In operation, one or more energy sources 10 or secondary energy emitters can be used to bombard the storage medium 20 with high-power-density energy beams. These beams can penetrate through multiple layers of the storage medium 20, depending on the material properties of the layers, the beam energy, etc. and therefore can transform portions of the phase-change layers 140, 160, 180 from a first phase to a second phase, thereby writing data bits 150, 155, 157.

During the reading operation, the energy source 10 can emit a low-power-density electron beam that can penetrate the storage medium 20 and that can inject electrons into any of the phase-change layers 140, 160, 180 illustrated. Once the electrons are injected into or near an unmodified portion of a phase-change layer 140, 160, 180, the electrons behave analogously to the electrons described in FIG. 4 and an unwritten portion of the phase-change layer can be detected.

When the electrons are injected into or near a second-phase portion of a phase-change layer 140, 160, 180 that extends completely between the immediately overlying conductor layer and the immediately underlying conductor layer, the electrons will behave similarly to when there is no second-phase portion at all. Effectively, no path will become relatively preferred as a result of the presence of second-phase portion and the electrons will travel to whichever adjacent conductor layer they would have traveled to in the absence of the second-phase portion.

When, however, the electrons are injected into a phase-change layer 140, 160, 180 that has a second-phase material extending only partly through the phase-change layer, then the electrons behave analogously to the electrons discussed in FIG. 5 and a data bit 150, 155, 157 can be detected.

When reading from the storage medium 20 illustrated in FIG. 6, a "0" data bit is detected when all adjacent pairs of conductor layers behave as though they were surrounding unwritten-to phase-change layers. When a second-phase material extends only partly through the top phase-change layer 140, this can indicate the presence of data bit 150 and can be read as a "1" data bit. When a second-phase material that extends only partly through the phase-change layer 160 between the second conductor layer 50 and the third conductor layer 70 is detected, a data bit 155 that extends through the entire first phase-change layer 140 and only partially through the second phase-change layer 160 may be present and can be read as a "2" data bit. A "3" data bit 157 would be detected as a second-phase material extending only partly through the phase-change layer 180 between the third conductor layer 70 and fourth conductor layer 90 and all phase-change layers 140, 160 above it.

It is also possible to record non-binary data bits by using just a single phase-change storage layer sandwiched by a single pair of conductor layers. This can be accomplished by varying the fraction of the storage layer that is phase-changed. For example, a "1" data bit could extend one third of the way through the storage layer while a "2" data bit could extend two-thirds of the way through. This way, the current split would be different for different data bits and the difference in currents detected in the adjacent conductor layers can allow for a determination of the value of the data bit.

The devices illustrated in FIGS. 4–6 may or may not be rewriteable, dependent on whether the change between the first phase and the second phase in the phase-change layers 140, 160, 180 is reversible. If the phase change is reversible, the data storage devices according to these embodiments may be written to numerous times, providing yet another advantage.

The foregoing detailed description has been given for understanding exemplary implementations of the invention only and no unnecessary limitations should be understood therefrom as modifications will be obvious to those skilled in the art without departing from the scope of the appended claims and their equivalents.

What is claimed is:

1. A data storage device comprising:
   a data storage medium that includes a first layer at a surface of the storage medium and
   a second layer between the first layer and a third layer, the first and third layers made of an electrically conductive material, the second layer made of electrically resistive material;
   an energy source positioned proximate to the data storage medium; and
   a nanometer-scaled data bit including an opening extending through a portion of the second layer.

2. The data storage device of claim 1, wherein the second layer comprises a thickness of between 2 and 100 nanometers.

3. The data storage device of claim 1, the second layer including a first region that includes a phase-change material and a second region that includes a resistive material with a resisitivity value between the resistivity value of a first place of the phase-change material and a second phase of phase-change material.

4. The data storage device of claim 3, the second layer comprises a material having a first state and a second state.

5. The data storage device of claim 3, wherein the data bit comprises a material in a state different from the state of the second layer.

6. The data storage device of claim 1, wherein the second layer comprises a thermally insulating material.

7. The data storage device of claim 1, wherein the second layer comprises at least one of a photoconductive material and a cathoconductive materia.

8. The data storage device of claim 1, wherein the second layer comprises at least one of a photoluminescent material and a cathodoluminescent material.

9. The data storage device of claim 1, wherein the energy source comprises at least one of a field emitter, a Spindt emitter and a Schottky emitter.

10. The data storage device of claim 1, further comprising at least one of a secondary energy emitter and a heating element positioned proximate to the storage medium.

11. A data storage device comprising:
    a data storage medium that includes a first layer at a surface of the storage medium and a second layer between the first layer and a third layer;
    an energy source positioned proximate to the data storage medium;
    a nanometer-scaled data bit extending through a portion of the second layer; and
    a third layer adjacent to the second layer and a fourth layer adjacent to the third layer.

12. The data storage device of claim 11, wherein the data bit extends through a portion of the fourth layer.

13. A method of storing data comprising:
    providing a data storage medium that includes a first layer at a surface of the storage medium and a second layer between the first layer and a third layer.

14. The method of claim 13, wherein the writing step further comprises forming a hole through the first layer and the second layer.

15. A method of storing data comprising:
    providing a data storage medium that includes a first layer at a surface of the storage medium and second layer between the first layer and a third layer;
    writing a nanometer-scaled data bit including an opening in the second layer by bombarding the storage medium with a high-power-density beam; and
    reading the data bit by bombarding the data storage medium with a low-power-density beam and monitoring how much electric current flows through the third layer.

16. A method of storing data comprising:
    providing a data storage medium that includes a first layer at a surface of the storage medium and a second layer between the first layer and a third layer;
    writing a nanometer-scaled data bit including an opening in the second layer by bombarding the storge medium with a high-power-density beam; and
    reading the data bit by bombarding the data storage medium with a low-power-density beam and comparing how much electric current flows through the first layer compared to the third layer.

17. A system of storing data comprising:
    means for providing a data storage medium that includes a first layer at a surface of the storage medium and a second layer between the first layer and a third layer;

means for writing a nanometer-scaled data bit including an opening in the second layer by bombarding the storage medium withy a high- power-density beam; and means for reading the data bit by bombarding the data storage medium with a low-power-density beam.

18. The data storage device of claim 17, wherein the means for writing further comprises mean for forming a hole through the first layer and the second layer.

19. The system of claim 17, wherein the means for writing further comprises means for changing a portion of the second layer from a first state to a second state.

20. The method of claim 17, wherein the means for reading further comprises means for monitoring how much electric current flows through the third layer.

21. The system of claim 17, wherein the means for reading further comprises means for comparing how much electric current flows through the first layer compared to the third layer.

22. A method of storing data comprising:

providing a data storage medium that includes a first layer at a surface of the storage medium and a second lever between the first layer and a third layer, the second layer including a first regiion that includes a phase-change material and a second region that includes a resistive material with a resisitivity value midway between the resisitivity value of a first phase of the phase-change material and a second phase of the phase-change material;

writing a nanometer-scaled data bit in the second layer by bombarding the storage medium with a high-power-density beam; and reading the data bit by bombarding the data storage medium with a low-power-density beam.

23. The method of claim 22, wherein the writing step further comprises changing a portion of the second layer from a first state to a second state.

24. A system of storing data comprising:

a data storage medium that includes a first layer at a surface of the storage medium and a second layer between the first layer and a third layer, the second layer including a first region that includes a phase-change material and a second region that includes a resistive material with a a resisitivity value midway between the resisitivity value of a first phase of the phase-change material and a secnond phase of the phase-change material;

means for writing a nanoameter-scaled databit in the second layer by bombarding the storage medium with a high-power-density beam; and means for reading the data bit by bombarding the data sorage medium with a low-power density beam.

25. A data storage device comprising:

a data storge medium including first and second electrically conductive layers, the first layer at a surface of the storage medium; _ a data storag layer between the first and second electrically conductive layrer; and an energy source for creating nanometer-scaled storage areas in the data layer.

26. The data storage device of claim 25, further comprising a read circuit for comparing currents flowing through the first and second conductive layers while the surface of the storage medium is being scanned with an enegy source.

27. The data storae device to claim 25, wherein the energy source creates bits that extend part way through the data storage layer.

28. The data storag device of claim 25, further comprising at least one insulator layer and at least one additional electrically conductive layer.

29. The data storage device of claim 25, wherein the data storage layer includes a first region of phase-change material and a second region of resistive material, resisivity of the second region being between resisitivity of a first phase of the phase-change material and resisitivity of a second phase of the phase-change-material.

30. The data storage device of claim 25, wherein the data storage layer includes data bits having a state different from the rest of the data storage layer.

31. The data storage device of claim 25, wherein the energy source forms holes in the data storage layer.

32. The data storage device of claim 25, further comprising at least on of an energy emitter and a heating elememt proximate the storage medium.

* * * * *